United States Patent [19]

Kiyomoto et al.

[11] Patent Number: 5,342,445
[45] Date of Patent: Aug. 30, 1994

[54] HYDRAULIC COMPOSITIONS AND HIGH-STRENGTH COMPOSITE MATERIALS

[75] Inventors: Masayuki Kiyomoto, Omiya; Akira Kajikawa, Funabashi; Toru Murakado, Yono; Hiroshi Sakurai, Iruma; Motokazu Mano, Urawa; Kazutika Sizume, Tokyo, all of Japan

[73] Assignee: Nippon Kayaku Kabushiki Kaisha, Tokyo, Japan

[21] Appl. No.: 28,638

[22] Filed: Mar. 9, 1993

Related U.S. Application Data

[63] Continuation of Ser. No. 621,801, Dec. 4, 1990, abandoned.

[30] Foreign Application Priority Data

Dec. 8, 1989 [JP] Japan .................................. 1-317688
Dec. 26, 1989 [JP] Japan .................................. 1-335188

[51] Int. Cl.$^5$ ............................................. C04B 7/14
[52] U.S. Cl. .................................... 106/789; 106/790; 106/823; 264/333; 264/DIG. 43
[58] Field of Search ............... 106/691, 726, 735, 781, 106/617, 618, 624, 790, 823, 789; 264/DIG. 43, 333

[56] References Cited

U.S. PATENT DOCUMENTS

| | | | |
|---|---|---|---|
| 3,809,665 | 5/1974 | Allemand et al. | 260/29.6 S |
| 4,175,975 | 11/1979 | MacWilliams et al. | 106/764 X |
| 4,224,076 | 9/1980 | Moitra et al. | 106/727 X |
| 4,306,912 | 12/1981 | Forss | 106/117 |
| 4,328,039 | 4/1982 | Masuda | 106/726 X |
| 4,363,667 | 12/1982 | Birchall et al. | 106/726 X |
| 4,560,413 | 12/1985 | Takagi et al. | 106/120 |
| 4,897,119 | 1/1990 | Clarke | 106/790 X |

FOREIGN PATENT DOCUMENTS

| | | |
|---|---|---|
| 152894 | 1/1991 | China . |
| 8702354 | 4/1987 | European Pat. Off. . |
| 2142282 | 1/1973 | France . |
| 589863 | of 0000 | Japan . |
| 5930746 | of 0000 | Japan . |
| 5930751 | of 0000 | Japan . |
| 6236059 | of 0000 | Japan . |
| 6259562 | of 0000 | Japan . |
| 63123842 | of 0000 | Japan . |
| 451660 | 3/1975 | U.S.S.R. . |
| 469672 | 5/1975 | U.S.S.R. . |
| 1033476 | 8/1983 | U.S.S.R. . |
| 796420 | 6/1958 | United Kingdom . |
| 1153299 | 5/1969 | United Kingdom . |
| 1366758 | 11/1974 | United Kingdom . |
| 2077251 | 12/1981 | United Kingdom . |

OTHER PUBLICATIONS

Grant & Hackh's "Chemical Dictionary" 1987, p. 23.
Chemical Abstracts, vol. 110, No. 8, Apr. 17, 1989, Columbus, Ohio, U.S., Abstract No. 140526, K. Sato, et al. "Cement compositions for underwater concrete with low dispersibility in water" p. 337; (abstract of JP-A-63 210 052 31 Aug. 1988).
Slag-Alkali Concretes on Fine-Grained Aggregates, Kiev, Vishcha Shkola, Publishers (1981).
SU Office Action and translation thereof.

*Primary Examiner*—Karl Group
*Assistant Examiner*—Paul Marcantoni
*Attorney, Agent, or Firm*—Nields & Lemack

[57] ABSTRACT

A hydraulic composition comprising blast furnace slag powder, a water-soluble polymer and an alkaline substance, and a high-strength composite material produced by kneading and molding a composition which comprises blast furnace slag powder, a water-soluble polymer, an alkaline substrate and water, and wet curing the molded composition. The high-strength composite material has high bending strength and excellent water resistance by using uncostly blast furnace slag powder.

10 Claims, No Drawings

HYDRAULIC COMPOSITIONS AND HIGH-STRENGTH COMPOSITE MATERIALS

This application is a continuation of 07/621,801, filed Dec. 4, 1990, now abandoned.

BACKGROUND OF THE INVENTION

The present invention relates to hydraulic compositions and high-strength composite materials using blast furnace slag powder. Particularly, the present invention relates to the hydraulic compositions and high-strength composite materials which can be used as interior or exterior building materials, structural materials and such.

Blast furnace slag powder is by-produced in bulk in the process of production of pig iron, and the gross amount of such slag powder produced reaches the order of tens of millions of tons annually. Many studies and attempts have been and are being made for effective utilization of blast furnace slag powder. A method of utilization of blast furnace slag powder is known in which by making use of potential hydraulic properties of blast furnace slag powder, it is added in an amount of several to several ten % to cement (ordinary Portland cement) to form so-called slag cement. In this method, however, blast furnace slag is used as an "annex" and merely constitutes a minor component of the cement.

Few reports are available on the successful preparation of a useful material which is mainly composed of blast furnace slag powder itself. The reason for backwardness in utilization of blast furnace slag powder is that although it is known that blast furnace slag powder is caused to exhibit its potential hydraulic properties by the addition of water and an alkali agent or a sulfate and its hardening (hydration) proceeds gradually, the produced hardened material is so frangible that it can hardly stand practical use.

Attention has been focused on the fact that the hardened body of blast furnace slag powder is weak in strength, especially in bending strength, and many studies have been made for the improvement of this point in recent years. However, the bending strength that could be achieved so far in the efforts for improvement of said hardened body of blast furnace slag powder remains in the range of 50–240 kgf/cm$^2$ (Japanese Patent Application Kokai (Laid-Open) Nos. 291443/86 and 286946/89).

The present inventors had found that there can be obtained a hardened material having a bending strength of several hundred kgf/cm$^2$ or even as high as 1,000 kgf/cm$^2$ under the favorable conditions, by merely kneading and molding an inorganic substance such as blast furnace slag powder, clay or talc with a water-soluble polymer, water and an optional alkali, and then drying the molded material, and had applied for a patent as to this finding. However such a hardened material had the problems that it was poor in resistance to water and humidity, excessively lowered in strength under high humidity and caused to dissolve from its surface when immersed in water, probably because such a material has not undergone hydration.

The present inventors have made strenuous studies for obtaining a high-strength water-resistant hardened material mainly composed of blast furnace slag powder and have consequently achieved the present invention.

SUMMARY OF THE INVENTION

The present invention provides:
1. a hydraulic composition comprising blast furnace slag powder, a water-soluble polymer and an alkaline substance;
2. a hydraulic composition set forth in item 1 above, further containing a fine aggregate.
3. a high-strength composite material produced by kneading and molding a composition which comprises blast furnace slag powder, a water-soluble polymer compound, an alkaline substance and water, and wet curing the molded composition;
4. a high-strength composite material produced by kneading and molding a composition which comprises blast furnace slag powder, a water-soluble polymer compound, an alkaline substance, a fine aggregate and water, and wet curing the molded composition;
5. a high-strength composite material set forth in item 3 or 4 above, wherein the water-soluble polymer compound has a carboxyl group and/or a carboxylate group and/or a carboxyamide group in the molecule;
6. a high-strength composite material set forth in item 5 above, wherein the water-soluble polymer is a poly(meth)acrylate, carboxymethyl cellulose, a poly(meth)acrylic amide or a copolymer of an (meth)acrylic acid and (meth)acrylamide;
7. a high-strength composite material set forth in item 6 above, wherein the water-soluble polymer is sodium poly(meth)acrylate;
8. a high-strength composite material set forth in item 4 above, wherein the fine aggregate has an average particle size of not greater than 100 $\mu$m; and
9. a high-strength composite material set forth in item 8 above, wherein the fine aggregate is fumed silica.

DETAILED DESCRIPTION OF THE INVENTION

The term "blast furnace slag powder" used in the description of the present invention refers to a powder formed by pulverizing and drying a vitreous material obtained by quenching with water or air the molten slag produced with pig iron in a blast furnace. In the present invention, there is ordinarily used a blast furnace slag powder having Blaine value (a specific surface area measured by Blaine permeability method) of greater than 2,000 cm$^2$/g, preferably greater than 3,000 cm$^2$/g. It is also possible to use a mixture of relatively coarse blast furnace slag powder with a Blaine value of less than 4,000 cm$^2$/g and fine blast furnace slag powder with Blaine value of greater than 5,000 cm$^2$/g.

The water-soluble polymer used in the present invention is not specifically defined, but such a polymer is preferably particulate as it is desirable that the polymer be dissolved uniformly and quickly in the kneading system in a short time. The average particle size of the particulate is preferably smaller than 100 $\mu$m. Shown below are the examples of the water-soluble polymers that can be used in the present invention.

(1) Water-soluble polymers having carboxyl group and/or carboxyamide group in the molecule and their salts Sodium $\alpha$-hydroxy-polyacrylate and homopolymers or copolymers made by using the following monomers as starting material, and/or their salts: (Meth)acrylamide monomers such as acrylamide, N,N-dimethylacrylamide and N- methylacrylamide; (meth)acrylic monomers such as (meth) acrylic acid, sodium (meth) acrylate, potassium (meth)acrylate, lithium (meth)acrylate and 2-hydroxyethyl (or 2-hydroxypropyl) (meth)acrylate; vinyl monomers such as N-vinylpyrrolidone, vinylmethyl ether and styrenesulfonic acid (or sodium or potassium salts thereof), and partial hydrolyzates of poly (meth) acrylamides.

(2) Cellulose derivatives hydroxypropyl methyl cellulose, hydroxyethyl methyl cellulose and carboxymethyl cellulose.

(3) Polyvinyl acetate derivatives partially hydrolyzed polyvinyl acetate, cationized polyvinyl acetate and anionized polyvinyl acetate.

(4) Soluble starch (5) Polyethylene oxide (6) (Meth)acrylic esters such as methyl (meth)acrylate, ethyl (meth)acrylate, propyl (meth)acrylate, and copolymers of styrene, ethylene, propylene or the like and aforementioned water-soluble monomers Especially, among the water-soluble polymers are preferred sodium poly(meth)acrylate, potassium poly(meth)acrylate, poly(meth)acrylamides, partial hydrolyzates of poly(meth)acrylamides or the salts thereof, copolymers of sodium (meth)acrylate and (meth)acrylamides, copolymers of potassium (meth)acrylate and (meth)acrylamides, and carboxymethyl cellulose. These (meth)acrylic acids or salts thereof and copolymers of (meth)acrylic amides and (meth)acrylates preferably have a molecular weight of over 10,000, more preferably greater than 100,000.

The amount of the water-soluble polymer used in the present invention is 1 to 15%, preferably 2 to 10% by weight based on the blast furnace slag powder. When the amount of the water-soluble polymer used is less than 1%, the mixture may not be kneaded in a desired way, or even if it can be kneaded, the obtained material tends to prove unsatisfactory in workability such as moldability in the ensuing steps. Use of the water-soluble polymer in excess of 15% does not provide a notable betterment of its effect on bending strength and water resistance of the obtained composite material, hence poor economy.

As the alkaline substance in the compositions or composite materials, it is possible to use all types of alkaline substance which are soluble in water and exhibit alkalinity. In the case of high-strength composite material, the form of the alkali substance is not restricted and the alkali substance may be added as an aqueous solution. Examples of the alkaline substances usable in the present invention include hydroxides of alkali metals such as sodium hydroxide, potassium hydroxide and lithium hydroxide; carbonates of alkali metals such as sodium carbonate, potassium carbonate and lithium carbonate; bicarbonates of alkali metals such as sodium bicarbonate, potassium bicarbonate and lithium bicarbonate; hydroxides of alkaline earth metals such as magnesium hydroxide and calcium hydroxide; oxides of alkaline earth metals such as calcium oxide and magnesium oxide; and Portland cement, Portland cement clinker, potassium pyrophosphate, sodium pyrophosphate, dipotassium phosphate, tripotassium phosphate, trisodium phosphate, potassium metasilicate, sodium metasilicate and the like. Among them, sodium hydroxide, sodium carbonate, sodium metasilicate and Portland cement clinker are preferred.

The amount of the alkaline substance used in the present invention, although variable depending on the degree of alkalinity of the alkaline substance and the amount of water used, is ordinarily 0.1 to 5%, preferably 0.2 to 3% by weight based on the blast furnace slag powder. When the amount of alkaline substance used is less than 0.1%, the kneaded and molded material may not be hardened by wet curing, or even if it is hardened, a long time is required for wet curing (hardening), which is industrially disadvantageous. On the other hand, when the amount of the alkaline substance used exceeds 5%, hardening tends to occur too rapidly and it may begin in the kneading and molding step. Thus, it is a notable feature of the present invention that the blast furnace slag powder can be cured even if the amount of the alkaline substance added is very small.

In a preferred embodiment of the present invention, a composition is prepared by using a fine aggregate. Examples of the fine aggregate usable in this invention are fumed silica, fly-ash, silica sand, pulverized silica sand, silica powder, clay, talc, kaolin, calcium carbonate, titania, zirconia, alumina and the like. The fine aggregate such as mentioned above serves as a filler of the voids in the high-strength composite material according to the present invention. Use of such fine aggregate is greatly conductive to the improvement of workability during molding of the kneaded material and to the reduction of shrinkage caused by drying of the hardened material. The mechanism of developing such an influence by said fine aggregate, however, is not yet clarified. Among said fine substances, fumed silica is the most preferred. The fine aggregate used in the present invention is preferably has an average particle size of not greater than 100 $\mu$m, more preferably smaller than 50 $\mu$m. It is usually preferable that the aggregate particles are as small as they can be in average size. In the present invention, such fine aggregate is used in a ratio of ordinarily 2 to 50%, preferably 5 to 30% (by weight) to the blast furnace slag powder, if necessary.

The hydraulic compositions of this invention can be obtained by mixing blast furnace slag, a water-soluble polymer and an alkaline substance, with a fine aggregate being further mixed in a preferred embodiment of the invention. Mixing may be performed while pulverizing the mixed material.

The amount of water used in producing a high-strength composition according to the present invention varies according to the amount of the water-soluble polymer used and the kind and amount of the alkaline substance. The amount of water used should be decided so that the mixture can be kneaded in a desired way. In view of this, water is ordinarily used in a ratio of 5 to 30%, preferably 10 to 20% (by weight) to the blast furnace slag powder.

The hydraulic compositions and high-strength composite material of this invention may be incorporated with a fibrous substance such as glass fiber, carbon fiber, vinylon fiber and the like for elevating toughness of the hardened body after molding and curing. It is also possible to add coarse aggregate such as crushed stones for cost reduction and further enhancement of strength or to add a hardening retarder for affording a sufficient working time in the kneading and molding step.

As the hardening retarder, there can be used sodium or potassium salts of gluconic acid, tartaric acid, malonic acid, succinic acid, maleic acid, fumaric acid, malic acid, formic acid, acetic acid, etc., and saccharides such as dextrose, levulose, sucrose, maltose, lactose, etc.

A typical production process of a high-strength composite material according to the present invention is described below.

First, a mixture of blast furnace slag powder, a water-soluble polymer, an alkaline substance (in case the alkaline substance used is of a highly hygroscopic type, it is adviced to add it after dissolving it in water and mixing the powdery component) and, an optional fine aggregate is prepared. This mixture is charged into a suitable mixer, e.g., rocking type mixer such as Omni-mixer (mfd. by Chiyoda Giken Kogyo Co., Ltd.), kneader-ruder type mixer, planetary mixer or the like and mixed up in a powdery state. The resulting mixture is added with a determined amount of water or water having dissolved therein an alkaline substance and further mixed (effecting crude kneading). The mixture is then subjected to kneading. Kneading is preferably performed by using a kneading machine which is capable of giving a strong shearing force to the crude-kneaded material. Examples of such kneading machine are roll kneader, Banbury mixer, wet Banbury mixer, mixing rolls, knett machine, bag mill, screw extruder, and kneader-ruder. This kneading is conducted until the kneaded material is rendered into a uniform and clay-like state.

The molding machine used in the present invention is also not subject to specific restrictions, but calender rolls, (low to high) pressure press, (vacuum) extrusion molding machine and the like are used at the ordinary condition. It is preferred to employ a method which enables molding under reduced pressure as it is possible with this method to obtain the hardened materials having higher bending strength and less in scatter of bending strength.

Molding is followed by wet curing. In the present invention, wet curing needs to be conducted under a high-humidity atmosphere which can at least inhibit evaporation of moisture in the kneaded and molded material. This wet curing is ordinarily carried out under an atmosphere with a relative humidity above 80%, preferably above 90%, or by employing a method which can prevent evaporation of water in the molded material, for example, by placing the molded material in a container or bag which is impervious to water or by holding the molded material between plastic or metal plates. Also, the molded material in the early phase of wet curing may be immersed in water to conduct curing therein.

In the present invention, it is generally observed that the higher the temperature applied for wet curing, the faster becomes hardening of the kneaded and molded material, but ordinarily a temperature in the range from room temperature to 100° C. is used for wet curing. Also, curing can be performed in an autoclave at a temperature above 100° C. by using water vapor. Wet curing time is greatly influenced by the kind and amount of the alkaline substance used and the wet curing conditions, but ordinarily it is in the range from one hour to 3 days.

Since the molded material (hardened) after wet curing contains water, it is preferable to dry such a hardened material before use. Drying temperature can be freely selected usually from between room temperature and 100° C., but it is preferred to perform drying gradually by spending enough time for it at a temperature close to room temperature rather than drying at a high temperature.

The high-strength composite material mainly composed of blast furnace slag powder, which has been obtained in the manner described above according to the present invention, has an outstandingly high bending strength that could never be obtained with the conventional techniques. The high-strength composite material also has very excellent water-resistance, that is, it shows a bending strength above 100 kgf/cm$^2$, preferably above 150 kgf/cm$^2$, even in a wet state after 24-hour water immersion at 25° C. and further it suffers little dimensional change due to water absorption.

EXAMPLES

The present invention will hereinafter be described more particularly in accordance with the examples thereof. But, these examples are not intended to limit the scope of the invention. In the following descriptions of the Examples, all "parts" are by weight unless otherwise noted.

Example 1

A hundred (100) parts of blast furnace slag powder (NKK Finest 40, produced by Nippon Kokan KK; Blaine value: 4,000 cm$^2$/g) and 5 parts of sodium polyacrylate (Panakayaku-B, produced by Nippon Kayaku KK) were supplied into a rocking type mixer (Omni-mixer, mfd. by Chiyoda Giken Kogyo KK) and mixed in a powdery state therein. The mixture was transferred into a polyethylene bag. Then an aqueous solution formed by dissolving 0.3 part of sodium hydroxide in 14 parts of water was added to said powdery mixture and the contents of the bag were kneaded lightly from the outside of the bag to obtain a crude kneaded material. This crude kneaded material was further kneaded under a high shearing force for 4 minutes by a twin-roll kneader (mfd. by Kyoei Tekko Co., Ltd.) to form a dough. This clay-like dough was molded into an about 4 mm thick plate by a twin-roll press (mfd. by Sagawa Seisakusho Co., Ltd.). This molding (plate) was put into a polyethylene bag and, after perfectly sealing the opening, the bag was placed in a thermostat of 80° C. to cure the molding for 24 hours. After this wet curing, the molding was found hardened solidly (forming a high-strength composite material of the present invention).

The hardened molding was taken out of the polyethylene bag and cut into a 1.5 cm wide and 7.5 cm long plate by a rotary diamond cutter (mfd. by Hitachi Koki KK) to prepare a sample for determining the bending properties. The thus obtained sample in a water-containing state was subjected to determination of bending properties by using Tensilon (UTM-2500, mfd. by Orientec Co., Ltd.) under the conditions of room temperature, bending rate of 1 mm/min and span of 6 cm, obtaining the following results:

Bending strength: 580 kgf/cm$^2$

Young's modulus: $2.27 \times 10^5$ kgf/cm$^2$

The hardened molding neither dissolved nor was deformed largely even when the water-wetted surface was rubbed or when the molding was immersed in water for one day.

Example 2

A high-strength composite material of the present invention was obtained by following the same procedure as Example 1 except for use of 0.5 part of sodium carbonate (anhydrous) in place of 0.3 part of sodium hydroxide.

The bending properties of the obtained composite material were determined in the same way as in Example 1 to obtain the following results:

Bending strength: 413 kgf/cm$^2$

Young's modulus: 2.12×10$^5$ kgf/cm$^2$

Example 3

A hundred (100) parts of blast furnace slag powder (NKK Finest 40 with Blaine value of 4,000 cm$^2$/g, produced by Nippon Kokan KK) and 5 parts of sodium polyacrylate (Panakayaku-B, produced by Nippon Kayaku KK) were mixed in the same rocking type mixer as used in Example 1, and the obtained powdery mixture was transferred into a polyethylene bag. Then an aqueous solution prepared by dissolving 2 parts of sodium silicate (nonahydrate) in 14 parts of water was added to said powdery mixture and the contents of the bag were kneaded lightly from the outside of the bag to obtain a crude kneaded material. This crude kneaded material was further kneaded under a strong shearing force by a twin-roll kneader for 4 minutes to obtain a clay-like kneaded material. This kneaded material was molded into a 4 mm thick plate by a twin-roll press. The molding (plate) was put into a polyethylene bag and after deaerating and sealing the bag, it was placed in a thermostat under the condition of 80° C. dryer for curing the contents of the bag for 12 hours to obtain a hardened material which is a high-strength composite material of the present invention. This hardened material was dried by leaving it in an atmosphere of 25° C. and 30% RH for one week to obtain a dry-state high-strength composite material.

The bending properties of a sample just after curing, a sample after drying and a sample after left in 25° C. pure water for 24 hours after drying were determined in the same way as Example 1 to obtain the following results:

Bending properties just after curing:

Bending strength: 273 kgf/cm$^2$

Young's modulus: 1.01×10$^5$ kgf/cm$^2$

Bending properties after drying:

Bending strength: 542 kgf/cm$^2$

Young's modulus: 1.81×10$^5$ kgf/cm$^2$

Bending properties after immersion in pure water:

Bending strength: 195 kgf/cm$^2$

Young's modulus: 0.95×10$^5$ kgf/cm$^2$

Examples 4–6

The high-strength composite materials of the present invention were obtained by following the same procedure as Example 1 excepting addition of 7 parts of sodium polyacrylate (Panakayaku-B, produced by Nippon Kayaku KK) to 100 parts of three types of blast furnace slag powder (Esment, produced by Nippon Steel Chemical Co., Ltd.) differing in Blaine value, namely 3,210, 4,000 and 6,070 cm$^2$/g, respectively, use of 2 parts of sodium carbonate (anhydrous) as alkaline substance, use of water in amounts of 13, 14 and 15 parts, and change of the wet curing conditions to 80° C. and one hour.

| Example | Blaine value of blast furnace slag powder (cm$^2$/g) | Amount of water used (parts) |
| --- | --- | --- |
| 4 | 3,210 | 13 |
| 5 | 4,000 | 14 |
| 6 | 6,070 | 15 |

These high-strength composite materials didn't dissolve and were also not deformed largely even when the water-wetted surfaces were rubbed or when they were kept immersed in water for a whole day.

The bending properties of these high-strength composite materials were determined in the same way as Example 1 to obtain the following results:

| Example | Bending strength (kgf/cm$^2$) | Young's modulus (× 10$^5$ kgf/cm$^2$) |
| --- | --- | --- |
| 4 | 297 | 1.82 |
| 5 | 272 | 1.82 |
| 6 | 223 | 1.50 |

Examples 7–10

The high-strength composite materials (hardened materials) of the present invention were obtained by carrying out the same process as Example 1 except for use of mixtures of Esment (produced by Nippon Steel Chemical Co., Ltd.) with Blaine value of 3,210 cm$^2$/g and Finest 120 (produced by Nippon Kokan KK) with Blaine value of 12,000 cm$^2$/g (in the ratios shown below) as blast furnace slag powder, use of 5 parts of Panakayaku-B (Nippon Kayaku KK) as sodium polyacrylate, use of 0.6 part of sodium hydroxide as alkaline substance, use of 13 parts of water and execution of wet curing in a thermostat under the conditions of 60° C. 95% RH and 24 hours

| | Mixing ratio of blast furnace slag powder | |
| --- | --- | --- |
| Example | Esment (3,210 cm$^2$/g) | Finest 120 (12,000 cm$^2$/g) |
| 7 | 95 | 5 |
| 8 | 90 | 10 |
| 9 | 80 | 20 |
| 10 | 60 | 40 |

These hardened materials neither dissolved nor were deformed largely even when the wetted surfaces were rubbed or when they were kept immersed in water for one day.

The bending properties of the obtained high-strength composite materials were determined according to the method of Example 1 to obtain the following results:

| Example | Bending strength (kgf/cm$^2$) | Young's modulus (× 10$^5$ kgf/cm$^2$) |
| --- | --- | --- |
| 7 | 288 | 2.23 |

-continued

| Example | Bending strength (kgf/cm²) | Young's modulus (× 10⁵ kgf/cm²) |
|---|---|---|
| 8 | 274 | 2.28 |
| 9 | 240 | 2.20 |
| 10 | 361 | 2.27 |

Examples 11-13

The high-strength composite materials (hardened) of the present invention were obtained by following the procedure of Example 1 except for addition of 7 parts, 5 parts and 3 parts of Panakayaku-B (produced by Nippon Kayaku KK) as sodium polyacrylate, respectively, to 100 parts of blast furnace slag powder (NKK Finest, produced by Nippon Kokan KK) with Blaine value of 4,000 cm²/g, use of 2 parts of sodium metasilicate (nonahydrate) as alkaline substance and use of water in the amounts shown below.

| Example | Amount of sodium polyacrylate (parts) | Amount of water used (parts) |
|---|---|---|
| 11 | 7 | 13 |
| 12 | 5 | 13 |
| 13 | 3 | 13 |

The obtained composite materials (hardened) neither dissolved nor were deformed largely even when the wetted surfaces were rubbed or when they were kept immersed in water for one lay.

The bending properties of these high-strength composite materials were determined in the same way as Example 1 to obtain the following results:

| Example | Bending strength (kgf/cm²) | Young's modulus (× 10⁵ kgf/cm²) |
|---|---|---|
| 11 | 355 | 2.25 |
| 12 | 331 | 2.31 |
| 13 | 291 | 2.38 |

Examples 14 and 15

The procedure of Example 1 was followed except for use of 1.0 part (Example 14) and 2.0 parts (Example 15) of sodium hydroxide as an alkaline substance and 48-hour wet curing in a 90° C. and 90% RH thermostat (mfd. by Kato Co., Ltd.) to obtain the hardened materials. The bending properties of the obtained hardened materials are shown below.

| Example | Amount of hydroxide sodium (parts) | Bending strength (kgf/cm²) | Young's modulus (× 10⁵ kgf/cm²) |
|---|---|---|---|
| 14 | 1.0 | 530 | 2.43 |
| 15 | 2.0 | 510 | 2.65 |

These hardened materials neither dissolved nor were deformed even when kept immersed in water for one day. Also, they showed the following bending properties after immersion in water for 7 days, indicating very excellent water resistance of these materials.

| Example | Bending strength (kgf/cm²) | Young's modulus (× 10⁵ kgf/cm²) |
|---|---|---|
| 14 | 420 | 2.37 |
| 15 | 400 | 2.52 |

Examples 16 and 17

The procedure of Example 14 was followed except for use of 3 parts (Example 16) and 5 parts (Example 17) of potassium polyacrylate as a polyacrylate and use of 1.0 part of potassium hydroxide as an alkaline substance to obtain the hardened materials. The bending properties of the obtained hardened materials are shown below. Potassium polyacrylate used in the above process was synthesized from an aqueous monomer solution with a concentration of 35% and a pH of 10 in a known way by using potassium persulfate as a polymerization initiator. The intrinsic viscosity ($\eta$) of the obtained polymer was 0.69, not much different from that (0.72) of sodium polyacrylate used in other Examples.

| Example | Amount of potassium polyacrylate (parts) | Bending strength (kgf/cm²) | Young's modulus (× 10⁵ kgf/cm²) |
|---|---|---|---|
| 16 | 3 | 490 | 2.35 |
| 17 | 5 | 420 | 2.42 |

These hardened materials neither dissolved nor were deformed even when kept immersed in water for one day. Also, they showed the following bending properties after immersion in water for 7 days, indicating very excellent water resistance of these materials.

| Example | Bending strength (kgf/cm²) | Young's modulus (× 10⁵ kgf/cm²) |
|---|---|---|
| 16 | 375 | 2.23 |
| 17 | 360 | 2.29 |

Examples 18-21

A mixture of 90 parts of blast furnace slag powder (NKK Finest 40, produced by Nippon Kokan KK), 10 parts of fumed silica (average particle size: 0.14 μm), 5 parts of sodium polyacrylate (Panakayaku-B, produced Nippon Kayaku KK), 0.25 parts of sodium hydroxide and 14 parts of water was kneaded under a strong shearing force by a twin-roll kneader for 4 minutes. The obtained clay-like kneaded material was extrusion molded under reduced pressure into a 10 cm wide and 4 mm thick plate by a vacuum extruder (Model HDE-2 mfd. by Honda Tekko Co., Ltd.). The molded material (plate) was cut to a length of 8 cm. The thus obtained moldings were wet cured in a 50° C. and 95% RH thermostat for 4 hours (Example 18), 8 hours (Example 19), 20 hours (Example 20) and 40 hours (Example 21), respectively, followed by 8-hour drying in an 80° C. thermostat to obtain the composite materials of the present invention.

The 1.5 cm wide and 7.5 cm long samples for determination of bending properties were prepared from the respective composite materials, and the bending properties of each sample before and after an immersion treatment (24-hour immersion in pure water of 25° C.) were determined. The determination was made by using Tensilon (UTM-2500, mfd. by Orientec Co., Ltd. ) under the conditions of span=6 cm and bending rate=1 mm/min. The results are shown below.

An analysis of contents in the blast furnace slag powder used in the present Examples gave the following results:

$SiO_2$: 34.1%; $Al_2O_3$: 14.2%; $Fe_2O_3$: 0.6%; CaO: 42.2%; MgO: 6.4%.

| Example | Bending strength (kgf/cm$^2$) | Young's modulus ($\times 10^5$ kgf/cm$^2$) |
| --- | --- | --- |
| Bending properties before immersion treatment | | |
| 18 | 990 | 2.66 |
| 19 | 980 | 2.61 |
| 20 | 912 | 2.55 |
| 21 | 924 | 2.71 |
| Bending properties after immersion treatment | | |
| 18 | 203 | 0.57 |
| 19 | 273 | 1.01 |
| 20 | 353 | 1.41 |
| 21 | 440 | 1.71 |

Examples 22-24

By using the same materials as in Examples 18-21 except for use of 7 parts (Example 22), 5 parts (Example 23) and 3 parts (Example 24) of sodium polyacrylate as a water-soluble polymer, use of 13 parts of water and use of 0.6 part of sodium hydroxide as an alkaline substance, kneading the mixture in the same way as in Examples 18-21 and molding the kneaded mixture by a twin-roll press, there were obtained the 4 mm thick plate-like moldings. These moldings (plates) were placed in a vinyl bag and, after perfectly sealing the bag opening, the bag was placed in an 80° C. thermostat for curing the moldings for 20 hours, which was followed by additional 8-hour drying at 80° C. to obtain the composite materials of the present invention. Determination of the bending properties of these materials conducted in the similar way to Examples 18-21 gave the following results.

| Example | Bending strength (kgf/cm$^2$) | Young's modulus ($\times 10^5$ kgf/cm$^2$) |
| --- | --- | --- |
| Bending properties before immersion treatment | | |
| 22 | 585 | 2.30 |
| 23 | 649 | 2.12 |
| 24 | 545 | 2.20 |
| Bending properties after immersion treatment | | |
| 22 | 327 | 1.75 |
| 23 | 362 | 2.21 |
| 24 | 305 | 2.22 |

Examples 25-27

The procedure of Examples 22-24 was followed except for use of 95 parts of blast furnace slag powder, use of 5 parts of fumed silica, use of 5 parts of sodium polyacrylate as a water-soluble polymer and use of 1 part (Example 25), 2 parts (Example 26) and 4 parts (Example 27) of sodium metasilicate (nona-hydrate) as an alkaline substance to obtain the composite materials of the present invention. The bending properties of these composite materials were determined in the same way as in Examples 18-21 to obtain the following results.

| Example | Bending strength (kgf/cm$^2$) | Young's modulus ($\times 10^5$ kgf/cm$^2$) |
| --- | --- | --- |
| Bending properties before immersion treatment | | |
| 25 | 423 | 2.62 |
| 26 | 782 | 2.66 |
| 27 | 535 | 1.86 |
| Bending properties after immersion treatment | | |
| 25 | 241 | 1.98 |
| 26 | 478 | 2.13 |
| 27 | 369 | 1.86 |

Examples 28-30

The procedure of Examples 25-27 was followed except for use of 7 parts of hydroxypropyl methyl cellulose (EMP-H, produced by Shin-Etsu Chemical Industries Co., Ltd. ) (Example 28), partially hydrolyzed polyvinyl acetate (KH-17, produced by Nippon Synthetic Chemical Industries Co., Ltd. ) (Example 29) or carboxymethyl cellulose (CMC-2170, produced by Daicel Chemical Industries Co., Ltd.) (Example 30), use of 0.6 part of sodium hydroxide (Examples 28 and 29) or 1 part of sodium carbonate (anhydrous) (Example 30) as an alkaline substance and use of 14 parts of water to obtain the composite materials of the present invention. The bending properties of these composite materials were determined according to the method used in Examples 18-21 to obtain the following results.

| Example | Bending strength (kgf/cm$^2$) | Young's modulus ($\times 10^5$ kgf/cm$^2$) |
| --- | --- | --- |
| Bending properties before immersion treatment | | |
| 28 | 452 | 1.74 |
| 29 | 280 | 1.95 |
| 30 | 311 | 2.01 |
| Bending properties after immersion treatment | | |
| 28 | 230 | 1.85 |
| 29 | 102 | 0.12 |
| 30 | 136 | 1.57 |

Examples 31-34

The procedure of Examples 25-27 was followed except for use of silica powder (av. particle size: 21 μm) (Example 31), clay (av. particle size: 12 μm) (Example 32), calcium carbonate (av. particle size: 3.5 μm) (Example 33) and titania (av. particle size: 0.3 μm) (Example 34) as a fine aggregate and use of an alkaline substance in the amounts shown below to obtain the composite materials of the present invention. The bending properties of these composite materials as determined in the same way as in Examples 18-21 were as shown below.

| Example | Kind and amount of fine aggregate (parts) | Kind and amount of alkaline substance (parts) |
| --- | --- | --- |
| 31 | Silica powder (30) | Sodium hydroxide (0.6) |
| 32 | Clay (7) | Sodium hydroxide (0.6) |
| 33 | Calcium carbonate (10) | Sodium hydroxide (0.6) |
| 34 | Titania (10) | Sodium metasilicate (2.0) |

Bending properties
Before immersion treatment:

| Example | Bending strength (kgf/cm$^2$) | Young's modulus ($\times 10^5$ kgf/cm$^2$) |
| --- | --- | --- |
| 31 | 448 | 1.91 |
| 32 | 470 | 1.78 |

-continued

| | 33 | 440 | 1.93 |
| | 34 | 528 | 1.87 |

After immersion treatment:

| Example | Bending strength (kgf/cm$^2$) | Young's modulus ($\times 10^5$ kgf/cm$^2$) |
|---|---|---|
| 31 | 151 | 1.08 |
| 32 | 162 | 1.03 |
| 33 | 140 | 1.00 |
| 34 | 173 | 1.08 |

Examples 35 and 36

The same process as Examples 18–21 was carried out except for use of 5 parts of sodium polyacrylate (Example 35) and potassium polyacrylate (Example 36) as a water-soluble polymer, use of 1.0 part of sodium hydroxide (Example 35) and potassium hydroxide (Example 36) as an alkaline substance and 48-hour wet curing in a thermohumidistat of 90° C. and 90% RH to obtain the high-strength composite materials of the present invention. The bending properties of these high-strength composite materials, after wet curing, after drying and before water immersion, and after one-day immersion in water are shown below. Potassium polyacrylate used in Example 36 was synthesized from an aqueous monomer solution with a concentration of 35% and a pH of 10 in a known way by using potassium persulfate as a polymerization initiator. The intrinsic viscosity ($\eta$) of this potassium polyacrylate was 0.69, not much different from that (0.72) of sodium polyacrylate used in the other Examples. These polymers were also substantial equal in molecular weight.

| Example | Bending strength (kgf/cm$^2$) | Young's modulus ($\times 10^5$ kgf/cm$^2$) |
|---|---|---|
| Bending properties after curing | | |
| 35 | 715 | 3.37 |
| 36 | 690 | 3.42 |
| Bending properties after drying and before water immersion | | |
| 35 | 1,055 | 3.62 |
| 36 | 990 | 3.66 |
| Bending properties after water immersion | | |
| 35 | 980 | 3.58 |
| 36 | 955 | 3.60 |

Examples 37 and 38

The procedure of Examples 35–36 was followed except for use of 3 parts of polyacrylamide (Kayafloc N-100, produced by Nippon Kayaku KK) (Example 37) and a copolymer of sodium acrylate and acrylamide (Kayafloc A-275, produced by Nippon Kayaku KK) (Example 38) as a water-soluble polymer, use of 2.0 parts of sodium hydroxide as an alkaline substance, use of 13 parts (Example 37) and 12 parts (Example 38) of water and 24-hour wet curing in a 90° C. and 90% RH thermohumidistat to obtain the high-strength composite materials of this invention. The bending properties of these high-strength composite materials after curing, after drying and before water immersion, and after one-day immersion in water are shown below.

| Example | Bending strength (kgf/cm$^2$) | Young's modulus ($\times 10^5$ kgf/cm$^2$) |
|---|---|---|
| Bending properties after curing | | |
| 37 | 555 | 3.34 |
| 38 | 520 | 3.25 |
| Bending properties after drying and before water immersion | | |
| 37 | 800 | 3.40 |
| 38 | 730 | 3.30 |
| Bending properties after water immersion | | |
| 37 | 715 | 3.38 |
| 38 | 680 | 3.27 |

Example 39

The procedure or Examples 35–36 was followed except for use of 3 parts of carboxymethyl cellulose (Celogen BSH-12, produced by Daiichi Kogyo Seiyaku Co., Ltd.) as a water-soluble polymer, use of 1.5 part of sodium hydroxide as an alkaline substance, use of 20 parts of water and 48-hour wet curing in a 90° C. and 90% RH thermohumidistat to obtain the high-strength composite materials of the present invention. The bending properties of these high-strength composite materials after wet curing, after drying and before water immersion, and after one-day immersion in water are shown below.

| | Example | Bending strength (kgf/cm$^2$) | Young's modulus ($\times 10^5$ kgf/cm$^2$) |
|---|---|---|---|
| After curing: | 39 | 390 | 1.87 |
| After drying and before water immersion: | 39 | 740 | 2.26 |
| After water immersion: | 39 | 300 | 2.02 |

Example 40

A hundred (100) parts of blast furnace slag powder (Esment with Blaine value of 4,000 cm$^2$/g, produced by Shin-Nittetsu Chemical Co., Ltd.), 5 parts of sodium polyacrylate (Panakayaku-B, produced by Nippon Kayaku KK) and 2 parts of anhydrous sodium metasilicate (produced by Nippon Chemical Industries Co., Ltd.) were supplied into a rocking type mixer (Omnimixer mfd. by Chiyoda Giken Kogyo KK) and mixed in a powdery state to obtain a hydraulic composition of the present invention.

Example 41

The procedure of Example 40 was followed except for use of 90 parts of blast furnace slag powder, 7 parts of sodium polyacrylate, 10 parts of silicafume (produced by Nippon Heavy Chemical Industries Co., Ltd.) and 1.5 part of powdery sodium hydroxide to obtain a hydraulic composition of the present invention.

What is claimed is:

1. A hydraulic composition comprising blast furnace slag powder;
   1 to 15% by weight based on the blast furnace slag powder of at least one water-soluble polymer having a molecular weight over 10,000 selected from the group consisting of poly(meth)acrylate, poly(meth)acrylamide, a copolymer of (meth)acrylic acid and (meth)acrylamide, carboxymethyl cellulose, and hydroxypropyl methyl cellulose, provided that when the water soluble polymer is selected from the group consisting of poly(meth)acrylate, poly(meth)acrylamide, and a copolymer of (meth)acrylic acid and (meth)acrylamide, its molecular weight is greater than 100,000; and 0.1 to 5% by weight based on the blast furnace slag powder of an alkaline substance selected from the group consisting of sodium hydroxide, potassium hydroxide, sodium carbonate, potassium carbonate, sodium silicate, and sodium metasilicate.

2. A hydraulic composition according to claim 1, which further comprises 2 to 50% by weight based on the blast furnace slag powder of a fine aggregate selected from the group consisting of fumed silica, titania, calcium carbonate, clay, pulverized silica sand and fly-ash.

3. A hydraulic composition according to claim 1 or 2, wherein the water-soluble polymer is sodium poly(meth)acrylate having a molecular weight of greater than 100,000.

4. A high-strength composite material showing bending strength above 100 kgf/cm$^2$, produced by the steps of kneading and molding a mixture comprising blast furnace slag powder; 1 to 15% by weight based on the blast furnace slag powder of at least one water-soluble polymer having a molecular weight over 10,000 selected from the group consisting of poly(meth)acrylate, poly(meth)acrylamide, a copolymer of (meth)acrylic acid and (meth)acrylamide, partially hydrolyzed polyvinyl acetate, carboxymethyl cellulose, and hydroxypropyl methyl cellulose, provided that when the water soluble polymer is selected from the group consisting of poly(meth)acrylate, poly(meth)acrylamide, or a copolymer of (meth)acrylic acid and (meth)acrylamide, its molecular weight is greater than 100,000; 0.1 to 5% by weight based on the blast furnace slag powder of an alkaline substance selected from the group consisting of sodium hydroxide, potassium hydroxide, sodium carbonate, potassium carbonate, sodium silicate, and sodium metasilicate; and 5 to 30% by weight based on the blast furnace slag powder of water, and wet curing the molded mixture.

5. A high-strength composite material according to claim 4, wherein said mixture further comprises 2 to 50% by weight based on the blast furnace slag powder of a fine aggregate selected from the group consisting of fumed silica, titania, calcium carbonate, clay, pulverized silica sand and fly-ash.

6. A high-strength composite material according to claim 5, wherein said fine aggregate has an average particle size of not greater than 100 μm.

7. A high-strength composite material according to claim 5, wherein said fine aggregate is fumed silica.

8. A high-strength composite material according to claim 4 or 5, wherein said water-soluble polymer is sodium poly(meth)acrylate.

9. A process for producing a high-strength composite material showing bending strength above 100 kgf/cm$^2$, comprising the steps of:

kneading and molding a mixture comprising blast furnace slag powder; 1 to 15% by weight based on the blast furnace slag powder of at least one water-soluble polymer having a molecular weight over 10,000 selected from the group consisting of poly(meth)acrylate, poly(meth)acrylamide, a copolymer of (meth)acrylic acid and (meth)acrylamide, partially hydrolyzed polyvinyl acetate, carboxymethyl cellulose, and hydroxypropyl methyl cellulose, provided that when the water soluble polymer is selected from the group consisting of poly(meth)acrylate, poly(meth)acrylamide, and a copolymer of (meth)acrylic acid and (meth)acrylamide, its molecular weight is greater than 100,000; 0.1 to 5% by weight based on the blast furnace slag powder of an alkaline substance selected from the group consisting of sodium hydroxide, potassium hydroxide, sodium carbonate, potassium carbonate, sodium silicate, and sodium metasilicate; and 5 to 30% by weight based on the blast furnace slag powder of water, and wet curing the molded mixture.

10. A process for producing a high strength composite material according to claim 9, wherein said mixture that is kneaded and molded further comprises 2 to 50% by weight based on the blast furnace slag powder of a fine aggregate selected from the group consisting of fumed silica, titania, calcium carbonate, clay, pulverized silica sand and fly-ash.

* * * * *